(12) United States Patent
Yoshimura et al.

(10) Patent No.: US 6,730,717 B2
(45) Date of Patent: May 4, 2004

(54) AQUEOUS GLITTERING INK COMPOSITION

(75) Inventors: Yasuyuki Yoshimura, Osaka (JP); Naoshi Murata, Osaka (JP); Yuki Yamamoto, Osaka (JP); Tomohiro Sawa, Osaka (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 10/091,883

(22) Filed: Mar. 6, 2002

(65) Prior Publication Data
US 2002/0128350 A1 Sep. 12, 2002

Related U.S. Application Data

(62) Division of application No. 09/523,619, filed on Mar. 13, 2000.

(30) Foreign Application Priority Data

| Mar. 19, 1999 | (JP) | 11-076868 |
| Dec. 20, 1999 | (JP) | 11-360187 |
| Jan. 11, 2000 | (JP) | 2000-002344 |
| Jan. 11, 2000 | (JP) | 2000-002370 |

(51) Int. Cl.$^7$ .......... C09D 11/16; C08K 3/08; C08K 3/10
(52) U.S. Cl. ......... 523/161; 524/437; 524/439; 524/441; 106/494; 106/640
(58) Field of Search .......... 523/160, 161; 524/441, 437, 497, 449, 439; 106/31.6, 31.95, 31.27, 494, 417, 640, 814

(56) References Cited

U.S. PATENT DOCUMENTS

| 3,087,828 A | * | 4/1963 | Linton ................ 106/417 |
| 4,606,992 A | * | 8/1986 | Bishop ............... 430/220 |
| 5,277,711 A | * | 1/1994 | Schmidt et al. ....... 106/404 |
| 5,510,397 A | * | 4/1996 | Okuda et al. ......... 523/161 |
| 6,299,376 B1 | * | 10/2001 | Nakatani ............. 401/215 |

FOREIGN PATENT DOCUMENTS

| EP | 600205 A1 | * | 6/1994 |
| JP | 7118592 A | * | 5/1995 |
| JP | 09268270 A | * | 10/1997 |
| JP | 10077438 A | * | 3/1998 |

OTHER PUBLICATIONS

English Translation of JP 10077438 A (Mar. 1998).*
English Translation of JP 7118592 A (May 1995).*
English Translation of EP 600205 A1 (Jun. 1994).*
English Translation of JP 09268270 A (Oct. 1997).*

* cited by examiner

Primary Examiner—Callie Shosho
(74) Attorney, Agent, or Firm—Howard C. Miskin, Esq.; Gloria Tsui-Yip Esq.

(57) ABSTRACT

The glittering ink composition of the present invention contains a glass flake pigment, a water-soluble resin, a water-soluble organic solvent and water as essential ingredients. The content of the glass flake pigment is 0.01–40% by weight relative to the total amount of the ink composition. Moreover, the ink composition contains a synthetic resin emulsion as a binder component for fixing the glass flake pigment to a handwriting or a coated film in 0.01–40% by weight in solids relative to the total amount of the ink composition. The synthetic resin emulsion has an anionic property or a nonionic property and its minimum film forming temperature is not higher than 20° C.

34 Claims, No Drawings

AQUEOUS GLITTERING INK COMPOSITION

CROSS-REFERENCE TO RELATED APPLICATION

This application is a divisional application of U.S. patent application Ser. No. 09/523,619, filed Mar. 13, 2000, said application being hereby incorporated herein by reference.

BACKGROUND OF THE INVENTION

1. Field of the Invention

The present invention relates to an aqueous glittering ink composition which can be suitably used for writing tools, printing inks, fields pertaining to coatings, cosmetics, and the like.

2. Description of the Prior Art

Heretofore, for the purpose of obtaining a handwriting with metallic luster such as gold and silver, aqueous ink compositions using glittering pigments have been proposed. For example, Japanese Unexamined Patent Publication No. 7-118592 proposes an aqueous ink composition using an aluminum powder pigment. Japanese Unexamined Patent Publication No. 8-151547 proposes an ink composition using a pearlescent pigment. Japanese Unexamined Patent Publication No. 11-29734 proposes an aqueous metallic ink prepared by coloring an aluminum powder with an organic pigment using a fixing agent.

However, in the case of such conventional aqueous ink compositions using glittering pigments such as aluminum powder pigment, pearlescent pigment and the like, it has been difficult to obtain handwritings or coating films with strong glittering feeling and spatial effect. Moreover, although in order to obtain metallic color a method has been adopted in which these glittering pigments are colored with coloring materials such as dyes and pigments, there has been a problem that the glittering feeling is lost in the coloring step because of the use of a resin.

The object of the present invention is to provide aqueous glittering ink compositions which can provide handwritings or coating films having a stronger glittering feeling in comparison with aqueous ink compositions using conventional glittering pigments, and moreover having together a strong spatial effect which conventional ink compositions never have.

The other object of the present invention is to provide aqueous glittering ink compositions which can provide handwritings or coated films having a strong glittering feeling without losing glitter in comparison with aqueous ink compositions using conventional glittering pigments.

SUMMARY OF THE INVENTION

As a result of intensive studies for achieving the aforementioned objects, the present inventors have adopted an aqueous glittering ink composition containing, at least, a glass flake pigment, a water-soluble resin, a water-soluble organic solvent and water. Furthermore, the present inventors have adopted an aqueous glittering ink composition containing, at least, a metal coated inorganic pigment, a water-soluble resin, a water-soluble organic solvent and water. The "metal coated inorganic pigment" used in the present invention is defined as a general term for inorganic pigments coated with at least one substance of metal and metal oxide.

Accordingly, the aqueous glittering ink composition containing the glass flake pigment can provide a handwriting or a coated films having a stronger glittering feeling and spatial effect than these achieved by aqueous ink compositions using conventional glittering pigments such as an aluminum powder pigment and a pearlescent pigment, because of the high surface smoothness inherent to glass.

Moreover, the aqueous glittering ink composition containing the metal coated inorganic pigment also can provide a handwriting or a coated film having a stronger glittering feeling than that achieved by aqueous ink compositions using conventional glittering pigments without losing glitter, because the inorganic pigment has been colored with metal deposition or the like.

DESCRIPTION OF THE PREFERRED EMBODIMENT (Glass Flake Pigment)

The glass flake pigment used in the present invention is defined as a pigment which has a structure wherein a flaky glass is coated with metal or the like and has a glittering feeling and spatial effect. As an example, a glass flake pigment formed of a flaky glass coated with metal by electroless plating can be used. For example, ones coated with silver available from Toyo Aluminium Co., Ltd. under the trade names of "Metashine REFSX-2015PS", "Metashine REFSX-2025PS" and "REFSX-2040PS" can be mentioned.

In addition, a glass flake pigment formed of a flaky glass coated with metal by spattering can also be used. For example, ones coated with silver available from Toyo Aluminium Co., Ltd. under the trade names of "Crystal Color GF2125", "Crystal Color GF2125-M", "Crystal Color GF2140" and "Crystal Color GF2140-M" can be mentioned. Also ones coated with nickel-chromium-molybdenum available from the same company under the trade names of "Crystal Color GF2525", "Crystal Color GF2525-M", "Crystal Color GF2540" and "Crystal Color GF2540-M" can be mentioned. Also, one coated with brass available from the same company under the trade name of "Crystal Color GF250", one coated with silver alloy available from the same company under the trade name of "Crystal Color GF1345", and one coated with titanium available from the same company under the trade name of "Crystal Color GF1445" can be mentioned.

In the present invention, the glass flake pigment preferably has a median diameter of 5.0–100 $\mu$m. When the median diameter of the glass flake pigment is less than 5.0 $\mu$m, the flake particles are so small that the glittering feeling becomes poor. On the other hand, the median diameter of the glass flake pigment of greater than 100 $\mu$m is unfavorable because the ink does not come out of a pen tip easily.

The glass flake pigment of the present invention is preferably contained in 0.01–40% by weight relative to the total amount of the ink composition. When the content of the glass flake pigment is less than 0.01% by weight relative to the total amount of the ink composition, only unsatisfactory glittering feeling and spatial effect can be obtained. When the content of the glass flake pigment exceeds 40% by weight relative to the total amount of the ink composition, the viscosity of the ink increases so high that the fluidity and writing performance of the ink become poor. The optimum content of the glass flake pigment ranges 0.5–30% by weight.

(Metal Coated Inorganic Pigment)

The metal coated inorganic pigment to be used in the present invention comprises, for example, an inorganic pigment which is coated with metal or metal oxide by means of metal deposition or the like. For example, aluminum coated with iron(III) oxide can be used. For example, ones available from BASF AG under the trade names of "Paliocrom Gold L2000", "Paliocrom Gold L2002", "Paliocrom Gold L2020", "Paliocrom Gold L2022", "Paliocrom Gold L2025", and "Paliocrom Orange L2800" can be mentioned. In addition, mica coated with iron(III) oxide can also be used. For example, ones available from BASF AG under the trade names of "Paliocrom Red Gold L2500" and "Paliocrom Red L4000" can be mentioned. Moreover, mica-like iron(III) oxide coated with aluminum-manganese can be used. For example, ones available from BASF AG under the trade names of "Paliocrom Copper L3000" and "Paliocrom Copper L3001" can be mentioned. Mica coated with reduced titanium dioxide can also be used. For instance, ones available from BASF AG under the trade names of "Paliocrom Blue Silver L6000" and "Paliocrom Blue Silver L6001" can be mentioned. Moreover, mica coated with titanium dioxide can also be used.

A median diameter of the aforementioned metal coated inorganic pigment also preferably ranges from 5.0–100 $\mu$m in common with the glass flake pigment. The case in which the median diameter is less than 5.0 $\mu$m is unfavorable because the inorganic pigment particle is so small that the glittering feeling becomes poor. The case in which the median diameter exceeds 100 $\mu$m is also unfavorable because when the metal coated inorganic pigment is used in the form of ink for ball-point pens, it does not come out of the pen tip easily.

As for the amount of the metal coated inorganic pigment to be compounded, the pigment is preferably contained in 0.01–40% by weight relative to the total amount of the ink composition in common with the glass flake pigment. When the content of the inorganic pigment is less than 0.01% by weight relative to the total amount of the ink composition, the glittering feeling becomes unsatisfactory. When the inorganic pigment exceeds 40% by weight relative to the total amount of the ink composition, the viscosity of the ink becomes so high that the fluidity is reduced. The optimum content of the inorganic pigment ranges from 0.5–30% by weight.

(Water-soluble Organic Solvent)

Water-soluble organic solvents capable of preventing both drying at the pen tip and freezing of the ink are preferably used, which can be exemplified by glycols such as ethylene glycol, diethylene glycol, triethylene glycol, propylene glycol and polyethylene glycol, polyhydric alcohols such as glycerin, glycol ethers such as ethylene glycol monomethyl ether, diethylene glycol monomethyl ether, dipropylene glycol monomethyl ether and dipropylene glycol monopropyl ether. These organic solvents may be used alone or in combinations of two or more of them.

The content of the water-soluble organic solvent is preferably contained in 1.00–40% by weight relative to the total amount of the ink composition. When the content of the water-soluble organic solvent is less than 1.00% by weight relative to the total amount of the ink composition, the pen tip becomes susceptible to dry and the ink becomes liable to freeze. When the content of the water-soluble solvent exceeds 40% by weight relative to the total amount of the ink composition, a handwriting or a coated film is difficult to dry out as well as solubility of the water-soluble resin being influenced. The optimum content of the water-soluble organic solvent, which varies depending on its type, ranges from 5.00–20% by weight.

(Colorant)

A colorant can be used in the present invention. The use of a colorant can adjust the ink colors to a variety of colors. It is important that such a colorant should be used as does not react with the aforementioned glass flake pigment or metal coated inorganic pigment nor does it influence coloring of such a glass flake pigment or metal coated inorganic pigment. Moreover, colorants with high solubility and dispersibility are favorable.

Examples include water-soluble dyes such as acid dyes, direct dyes and basic dyes, inorganic pigments such as carbon black and titanium oxide, organic pigments such as copper phthalocyanine pigments, threne pigments, azo pigments, quinacridon pigments, anthraquinone pigments, dioxane pigments, indigo pigments, thioindigo pigments, perinone pigments, perylene pigments, indolenone pigments and azomethine pigments, and fluorescent pigments, colored resin emulsions and the like can be mentioned. These also may be used in the form of a pigment dispersion. The present invention can use one species of pigment or can use two or more species of pigments in combination. Moreover, the glass flake pigment or metal coated inorganic pigment in the present invention can be used after being mixed with glittering pigments including aluminum powder pigments and pearlescent pigments. Furthermore, they can be mixed with opacifying pigments including a variety of inorganic or organic white pigments such as titanium oxide, alkylene bismelamine derivatives, plastic pigments (synthetic resin particle pigments) with opacifying power of various shapes including spherical shapes, oblate shapes and the like. The metal coated inorganic pigment also can be used together with the glass flake pigment.

Such a colorant need not be contained in the aqueous ink composition of the present invention. Even aqueous ink compositions containing not colorants but glass flake pigments or metal coated inorganic pigments can provide high glittering feeling and high spatial effect to handwritings or coated films. Also even aqueous ink compositions not containing colorants but containing metal coated inorganic pigments can add high glittering feeling to handwritings or coated films. The aforementioned aqueous ink compositions containing colorants, however, are extremely preferable because they can provide a glittering feeling depending upon the hue or the like of the colorants contained.

The colorant is preferably contained in 0.01–30% by weight relative to the total amount of the ink composition. When the colorant is less than 0.01% by weight relative to the total amount of the ink composition, coloring by the colorant is difficult to be visually recognized. When the colorant exceeds 30% by weight in the total amount of the ink composition, the viscosity of the ink becomes so high that the fluidity becomes poor. The optimum amount of the colorant to be compounded, which varies depending on its type, ranges from 0.05–20% by weight.

(Water-soluble Resin)

As a water-soluble resin, preferably used is the water-soluble thickening resin which is capable of dispersing the glass flake pigment or the metal coated inorganic pigments and of preventing them from precipitation. Applicable as polysaccharides are microbial polysaccharides and derivatives thereof, including pullulan, xanthan gum, welan gum, rhamsan gum, succinoglucan and dextran; water-soluble polysaccharides derived from plants and derivatives thereof including tragacanth gum, guar gum, tara gum, locust bean gum, ghatti gum, arabinogalactan gum, gum arabic, quince seed gum, pectin, starch, psyllium seed gum, pectin, carrageenan, alginic acid, agar and the like; water-soluble polysaccharides derived from animals and derivatives thereof including gelatin, casein and albumin. Moreover, N-vinylacetamide type resins such as N-vinylacetamide resin and crosslinked N-vinylacetamide resin can be used as the thickening resin.

In the present invention, the microbial polysaccharides and derivatives thereof can specifically and preferably be used among the aforementioned water-soluble resins. Such water-soluble resins can be used either alone or in combinations of two or more of them.

The water-soluble resin is preferably contained in 0.01–40% by weight relative to the total amount of the ink composition. If the content of the water-soluble resin is less than 0.01% by weight relative to the total amount of the ink composition, effect on preventing precipitation of the glass flake pigment or the metal coated inorganic pigment becomes unsatisfactory. When the water-soluble resin exceeds 40% by weight relative to the total amount of the ink composition, the viscosity of the ink becomes so high that the fluidity becomes poor. The optimum amount of the water-soluble resin to be compounded, which varies depending on its type, ranges 0.05–20% by weight.

(Synthetic Resin Emulsion)

As previously mentioned, the present inventors have found that in order to obtain handwriting of metallic luster color such as gold and silver and the like, the use of glass flake pigments for ink compositions containing a water-soluble thickening resin, a water-soluble organic solvent and water is preferable. The glass flake pigments can provide, to handwritings or coated films, glittering feeling and spatial effect higher than those with aluminum powder pigments and pearlescent pigments.

However, they have also found that although an aqueous glittering ink composition containing a water-soluble thickening resin can increase the fixability of the glass flake pigments by this water-soluble thickening resin, it is difficult to fix firmly to handwritings or coated films since the size of the glass flake pigment is large. Accordingly, in the case of the aqueous ink composition containing glass flake pigments, the glass flake pigments are easily peeled by friction after writing or coating and it is difficult to maintain high glittering feeling and spatial effect to handwritings or coated films. Therefore, the durability of handwritings or coated films having glittering feeling and spatial effect becomes poor.

From the above-mentioned situation, an important problem is to provide aqueous glittering ink compositions which can improve the fixability of glass flake pigments to handwritings or coated films and maintain a higher glittering feeling and spatial effect for the handwritings or coated films without deteriorating ink characteristics or writing characteristics and without inhibiting the effects on the high glittering feeling and spatial effect derived from compounding the glass flake pigments.

As a result of intensive studies for solving this problem, they have found that the problem can be solved by aqueous glittering ink compositions containing, as essential ingredients, a glass flake pigment, a water-soluble thickening resin, a water-soluble organic solvent and water, and further containing a binder component which fixes the glass flake pigment to handwritings or coated films.

On the other hand, another possible option for fixing such a glass flake pigment to handwritings or coated films is to use a water-soluble synthetic resin as a binder component. However, in the case of some water-soluble synthetic resins, if the contents thereof are set to be high in order to fix the glass flake pigment firmly, the solubility of the thickening resin and dispersibility of the colorant are badly influenced. Moreover, there may be cases where viscoelasticity of the ink are greatly reduced, which leads to reduction in writing characteristics. Moreover, even if fixability to handwritings or coated films is shown, aqueous ink compositions should not be the ones wherein high glittering feeling and spatial effect of the glass flake pigment are contained but are poor in handwritings or coated films.

The present inventors have made further intensive studies. As a result, they have found that the use of a synthetic resin emulsion as a binder component for fixing the glass flake pigment to handwritings or coated films permits improvement in fixability of the glass flake pigment to handwritings or coated films without influencing the solubility of water-soluble thickening resins, dispersibility of colorants, viscoelasticity of ink, and coloring of ink and without inhibiting effects of high glittering feeling and spatial effect by compounding the glass flake pigment, and they have accomplished the present invention.

Accordingly, the aqueous ink composition of the present invention which contains a glass flake pigment is capable of improving the fixability of the glass flake pigment to handwritings or coated films, forming handwritings or coated films of durability, and maintaining a high glittering feeling and spatial effect for the handwritings or coated films when it is put on a substrate such as paper, metal, plastics and textile fabrics by writing or coating. The reason for this is that the film formability of the synthetic resin emulsion is suitable for glass flake pigments having a large-sized flake shape and the glass flake pigment can be fixed firmly to handwritings or coated films without inhibiting the effects of high glittering feeling and spatial effect by compounding the glass flake pigment.

Moreover, since the binder component used in the present invention is not a water-soluble synthetic resin but a synthetic resin emulsion, it does not influence properties including solubility of the water-soluble thickening resin to be compounded together, dispersibility of the colorant and viscoelasticity of the ink very much. The ink composition of the present invention therefore can improve the fixability of the glass flake pigment without influencing the viscoelasticity of the ink, writing characteristics and color of handwritings or coated films.

From such facts, the aqueous glittering ink composition of the present invention containing the glass flake pigment can maintain, in handwritings or coated films, a glittering feeling and spatial effect higher than those achieved by the conventional aqueous ink compositions using glittering pigments such as aluminum powder pigments and pearlescent pigments without deteriorating ink characteristics, writing performance or the like or without inhibiting the high surface smoothness inherent to glass.

The synthetic resin emulsion of the present invention is not specifically limited and any water-dispersive synthetic resin emulsion is available. Considering the ink characteristics and writing performance however, it is important to use the ones which do not influence solubility of water-soluble thickening resin, viscosity of the ink, dispersibility of the colorant and coloring of the ink. Moreover, it is important not to inhibit the effect on the high glittering feeling and spatial effect caused by the composition of the glass flake pigment.

The minimum film forming temperature of the synthetic resin emulsion is preferably not higher than 20° C. If the minimum film forming temperature of the synthetic resin emulsion is not higher than 20° C., particularly not higher than 0° C., a film can be formed not only at room temperature (about 25° C.) but in a cold district and fixability of handwritings or coated films to substrates can be improved.

Synthetic resin emulsions having an anionic property or a nonionic property preferably can be used. Such synthetic resin emulsions having the anionic property or the nonionic property can be prepared, for example, by producing synthetic resins from anionic or nonionic monomers or using anionic or nonionic emulsifiers. If the synthetic resin emulsion has the anionic property or the nonionic property, the stability of the ink composition can be improved.

Preferred synthetic resin emulsions do not influence the dispersibility of colorants or solubility of water-soluble thickening resin when the pH of inks are 6 or more.

From such a viewpoint, for example, acryl based synthetic resin emulsions, styrene-acryl based synthetic resin emulsions and vinyl acetate based synthetic resin emulsions can be used as a synthetic resin emulsion. Preferred examples of the acryl based synthetic resins include acrylate copolymer synthetic resin emulsions. Preferred examples of the styrene-acryl based synthetic resin emulsions include styrene-acrylate copolymer synthetic resin emulsions. As the vinyl acetate based synthetic resin emulsions, vinyl acetate synthetic resin emulsions and vinyl acetate-acrylate copolymer synthetic resin emulsions, for example, are preferably used. As the synthetic resin emulsion, one species of these synthetic resins can be used and also two or more species of these synthetic resins can be used in combination.

For example, the acryl based synthetic resin emulsion can be exemplified by the trade name "Nikasol FX336" (manufactured by Nippon Carbide Industries Co., Inc.; anionic; pH 7.5; minimum film forming temperature=0° C.), the trade name "Mowinyl DM772" (manufactured by Clariant Polymers Co., Ltd; anionic; pH 8.5; minimum film forming temperature=12–14° C.) and the trade name "Mowinyl 700" (manufactured by Clariant Polymers Co., Ltd; anionic; pH 8.0; minimum film forming temperature=5° C.). The vinyl acetate based synthetic resin emulsion can be exemplified by the trade name "Nikasol TG134A" (manufactured by Nippon Carbide Industries Co., Inc.; pH 7.5; minimum film forming temperature=0° C.) and the trade name "Mowinyl 507" (manufactured by Clariant Polymers Co., Ltd; nonionic; pH 6.5; minimum film forming temperature=0° C.).

Although the content of the synthetic resin emulsion is not particularly specified, a preferable range is 0.01–40% by weight in solids relative to the total amount of the ink composition, for example. The content of the synthetic resin emulsion of less than 0.01% by weight in solids relative to the total amount of the ink composition results in reduction in fixability of the glass flake pigment to handwritings or coated films. If the content of the synthetic resin emulsion exceeds 40% by weight in solids relative to the total amount of the ink composition, the solids are so high that writing characteristics are deteriorated because of, for example, film formation at the pen tip. In addition, handwritings or coated films are liable to whiten. In order to improve the fixability of the glass flake pigment to handwritings or coated films further, the most desirable content of the synthetic resin emulsion is at least 0.3% by weight in solids relative to the total amount of the ink composition. Moreover, in order to improve writing characteristics further, the most desirable content of the synthetic resin emulsion is 20% by weight in solids relative to the total amount of the ink composition. That is, the optimum content of the synthetic resin emulsion is 0.3–20% by weight.

In addition, also in the case of the ink composition containing the synthetic resin emulsion as a binder component together with the glass flake pigment, it is important that the resins can adjust viscosity of the ink and facilitate dispersion of the glass flake pigment and prevent its precipitation. Water-soluble thickening resin with a function to form a film of handwritings or coated films can be used. For example, microbial polysaccharides and derivatives thereof can be used, including pullulan, xanthan gum, welan gum, rhamsan gum, succinoglucan and dextran. Water-soluble polysaccharides derived from plants and derivatives thereof also can be used, including tragacanth gum, guar gum, tara gum, locust bean gum, ghatti gum, arabinogalactan gum, gum arabic, quince seed gum, pectin, starch, psyllium seed gum, pectin, carrageenan, alginic acid and agar. Water-soluble polysaccharides derived from animals and derivatives thereof can also be used, including gelatin, casein and albumin.

As the water-soluble thickening resin, salts (sodium salts, ammonium salts and the like) of water-soluble resins (acryl based water-soluble resins, styrene-acryl based resins, styrene-maleic acid based resins and the like), water-dispersion type resins and the like can also be used.

In the case of ink compositions which contain a synthetic resin emulsion as a binder component together with the glass flake pigment, the microbial polysaccharides and derivatives thereof can be used preferably among the aforementioned water-soluble thickening resins. Such water-soluble thickening resins can be used either alone or in combinations of two or more of them.

In the case of ink compositions which contain a synthetic resin emulsion as a binder component together with the glass flake pigment, the water-soluble thickening resin is preferably contained in 0.01–40% by weight relative to the total amount of the ink composition. In the case where the water-soluble thickening resin is less than 0.01% by weight relative to the total amount of the ink composition, the glass flake pigment is liable to precipitate. If the water-soluble thickening resin exceeds 40% by weight relative to the total amount of the ink composition in the case of the ink composition containing the synthetic resin emulsion, the viscosity of the ink becomes so high that the fluidity becomes poor and writing characteristics are deteriorated. The optimum amount of the water-soluble thickening resin to be compounded somewhat varies depending upon the type of the water-soluble thickening resin, but is 0.05–20% by weight.

Also in the case of the ink composition containing a synthetic resin emulsion as a binder component, water-soluble organic solvents which are capable of preventing both drying at the pen tip and freezing of the ink are preferably used, which can be exemplified by glycols such as ethylene glycol, diethylene glycol, triethylene glycol, propylene glycol and polyethylene glycol, polyhydric alcohols such as glycerin, and glycol ethers such as ethylene glycol monomethyl ether, diethylene glycol monomethyl ether, dipropylene glycol monomethyl ether and dipropylene glycol monopropyl ether, and the like. These organic solvents can be used either alone or in combination of two or more of them.

As for water-soluble organic solvents, aliphatic monohydric alcohols with 1 to 4 carbon atoms, aliphatic polyhydric alcohols such as glycerin, glycols such as propylene glycol and glycol ethers such as propylene glycol monomethyl ether and the like are preferably used.

Also in the case of the ink composition containing the synthetic resin emulsion as a binder component together with the glass flake pigment, the content of the water-soluble organic solvent is 1–40% by weight relative to the total amount of the ink composition. In the case where the content of the water-soluble organic resin is less than 1% by weight relative to the total ink composition, a pen tip is liable to dry and the ink becomes liable to freeze. If the content of the water-soluble organic solvent exceeds 40% by weight relative to the total amount of the ink composition, the solubility of the water-soluble thickening resin is influenced and handwritings and coated films become hard to dry. In the case of this ink composition, the optimum amount of the water-soluble organic solvent to be compounded varies depending upon the type of the water-soluble organic solvent, but is 5–30% by weight.

Also in the case of the ink composition containing the synthetic resin emulsion as a binder component together with the glass flake pigment, colorants can be used. The use of colorants-can adjust the color of the ink to various colors. It is important to use colorants which do not react with the glass flake pigments and do not influence the coloring of the glass flake pigments. Moreover, the one excellent in solubility and dispersibility are preferable as a colorant.

For example, water-soluble dyes such as acid dyes, direct dyes and basic dyes (triphenylmethane-type, xanthene-type, anthraquinone-type, metal complex-type, copper phthalocyanine-type and the like), organic pigments or inorganic solvents such as phthalocyanine, quinacridone, carbon black and titanium oxide, or fluorescent pigments, resin emulsions, colored resin emulsion and the like can be used. The colorant also can be compounded in the form of a pigment dispersion. The colorants can be used either alone or in combinations of two or more of them.

Also in the case of the ink composition containing the synthetic resin emulsion together with the glass flake pigment, colorants need not be contained. Even aqueous ink compositions containing not colorants but glass flake pigments can add a high glittering feeling and high spatial effect to handwritings or coated films. Each of the aforementioned aqueous ink compositions containing colorants, however, is extremely preferable because they can provide high brilliance depending upon the hue or the like of the colorants contained.

In the case of the ink composition containing the synthetic resin emulsion as a binder component together with the glass flake pigment, the content of the colorant is preferably 0.01–30% by weight relative to the total amount of the ink composition. When the colorant is less than 0.01% by weight relative to the total amount of the ink composition, the coloring by the colorant becomes difficult to be visually recognized. When the colorant exceeds 30% by weight relative to the total amount of the ink composition, the viscosity of the ink becomes so high that the fluidity becomes poor and glittering feeling is deteriorated. The optimum amount of the colorant to be compounded, which varies depending on its type, is 0.05–20% by weight.

(Other Additives)

Moreover, to the ink composition of the present invention can be compounded conventional water such as ion-exchange water. In addition, as needed, lubricants such as polyoxyethylene alkali metal salts, dicarboxylic amides, phosphates and N-oleyl sarcosine salts and the like, rust-inhibitors such as benzotriazole and tolyltriazole dicyclohexyl ammonium nitrate and the like, antiseptic mildew-proofing agents such as benzoisothiazoline-type, pentachlorophenol-type and cresol and the like, and various surfactants can be added.

(Viscosity Range)

The preferred viscosity range of the ink composition is 1000–10000 mPa.s. The ink composition of the present invention is adjusted to such a viscosity range. These viscosities are measured values by an ELD-type viscometer (3° R14 corn; rotation speed: 0.5 rpm; 20° C.).

(Applications)

The aqueous glittering ink composition can be used in the fields of writing tools, printing, coating and cosmetics and the like. It is useful in a variety of applications as an aqueous glittering ink composition for writing tools (an aqueous glittering ink composition for ball-point pens and the like), an aqueous glittering ink composition for printing, an aqueous glittering ink composition for applicators (an aqueous glittering ink composition for coating and the like) and the like. It is particularly the most desirable as an aqueous glittering ink composition for ball-point pens.

(Method of Preparation)

The aqueous glittering ink composition of the present invention is not specifically limited but can be obtained, for example, by mixing and stirring ingredients such as water, a water-soluble organic solvent, a glass flake pigment and a colorant or a pigment base to disperse them, and thereafter charging a water-soluble resin and filtering the resulting mixture, and subsequently degassing. In particular, the ink composition containing the synthetic resin emulsion as a binder component together with the glass flake pigment is preferably prepared by the following process, although the preparation is not specifically limited. First, water, a water-soluble organic solvent, and, as needed, other additives are mixed and stirred; to the mixture is charged the glass flake pigment, and the resulting mixture is stirred; and thereafter a water-soluble thickening resin is added and stirred. Next, the pH of the mixed liquid is adjusted as needed, and a colorant is added and stirred, as needed. Subsequently, the synthetic resin emulsion is added and mixed.

As for these preparations, heretofore known dispersing techniques, degassing techniques, filtering techniques and the like can be adopted.

EXAMPLES

Aqueous glittering ink compositions of the Examples provided by mixing and stirring ingredients including water, a water-soluble organic solvent, a glass flake pigment and a colorant or a pigment base and the like in the compositions and amounts (parts by weight) given in Table 1 to disperse them, thereafter charging a water-soluble resin and filtering the resulting mixture, and subsequently degassing. For comparison, aqueous glittering ink compositions of the Comparative Examples were prepared by mixing and stirring ingredients including water, a water-soluble organic solvent, a glittering pigment and the like to disperse them, thereafter charging a water-soluble resin and filtering the resulting mixture, and subsequently degassing. In every preparation, heretofore known dispersing, degassing, filtering techniques and the like were used.

Likewise, aqueous glittering ink compositions of other Examples and Comparative Examples were prepared by mixing and stirring ingredients including water, a water-soluble organic solvent and a glittering pigment and the like in the compositions and amounts (parts by weight) given in Table 2 to disperse them, thereafter charging a water-soluble resin and filtering the resulting mixture, and subsequently degassing. In every preparation, heretofore known dispersing, degassing, filtering techniques and the like were used.

In the same manner as previously mentioned, aqueous glittering ink compositions of other Examples and Comparative Examples were prepared by mixing and stirring ingredients including a glass flake pigment or brilliant pigment, water, a water-soluble organic solvent and the like in the compositions and amounts (parts by weight) given in Tables 3–8 to disperse them, thereafter charging a water-soluble resin and filtering the resulting mixture, and subsequently degassing. In every preparation, heretofore known dispersing, degassing, filtering techniques and the like were used.

For information, a colored emulsion containing a fluorescent pigment is used as a colorant in Examples in Table 6.

TABLE 1

| | | Examples | | | | | Comparative Examples (Parts by weight) | |
|---|---|---|---|---|---|---|---|---|
| | | 1 | 2 | 3 | 4 | 5 | 1 | 2 |
| Glass flake pigment | ① | 7.0 | — | 7.0 | — | — | — | — |
| | ② | — | 5.0 | — | 5.0 | 10.0 | — | — |
| Glittering pigment | ① | — | — | — | — | — | 5.0 | — |
| | ② | — | — | — | — | — | — | 10.0 |
| Water-soluble resin | ① | 0.3 | 0.3 | — | — | — | 0.3 | — |
| | ② | — | — | 0.3 | 0.3 | 0.2 | — | 0.3 |
| Colorant | ① | 1.0 | 1.0 | — | — | — | — | — |
| | ② | — | — | — | — | 2.0 | — | — |
| Pigment base | ① | — | — | 20.0 | 20.0 | — | — | — |
| Water-soluble organic solvent | ① | 5.0 | 5.0 | 5.0 | 5.0 | — | 5.0 | 5.0 |
| | ② | — | — | — | — | 7.0 | — | — |
| | ③ | — | — | — | — | 14.0 | — | — |
| Antiseptic mildew-proofing agent | ① | 0.1 | 0.1 | 0.1 | 0.1 | 0.1 | 0.1 | 0.1 |
| Rust-inhibitor | | 0.1 | 0.1 | 0.1 | 0.1 | 0.1 | 0.1 | 0.1 |
| Lubricant | | 1.2 | 1.2 | 1.2 | 1.2 | 1.2 | 1.2 | 1.2 |
| Water | | 85.3 | 87.3 | 66.3 | 68.3 | 65.4 | 88.3 | 83.3 |
| Evaluation test | | | | | | | | |
| Glittering feeling | | ○ | ○ | ○ | ○ | ○ | X | X |
| Spatial effect | | ○ | ○ | ○ | ○ | ○ | X | X |
| Writing performance | | ○ | ○ | ○ | ○ | ○ | ○ | ○ |

TABLE 2

| | | Examples | | | | | Comparative Examples (Parts by weight) |
|---|---|---|---|---|---|---|---|
| | | 6 | 7 | 8 | 9 | 10 | 3 |
| Glittering pigment | ③ | 7.0 | — | 7.0 | — | 7.0 | — |
| | ④ | — | 5.0 | — | 5.0 | — | — |
| | ① | — | — | — | — | — | 7.0 |
| Water-soluble resin | ① | 0.3 | 0.3 | — | — | — | — |
| | ② | — | — | 0.3 | 0.3 | 0.2 | 0.3 |
| | ③ | — | — | — | — | — | 3.0 |
| Water-soluble organic solvent | ① | 5.0 | 5.0 | 5.0 | 5.0 | — | 5.0 |
| | ② | — | — | — | — | 7.0 | — |
| | ③ | — | — | — | — | 14.0 | — |
| Colorant | ② | — | — | — | — | 2.0 | — |
| Pigment base | ② | — | — | — | — | — | 40.0 |
| Antiseptic mildew-proofing agent | ① | 0.1 | 0.1 | 0.1 | 0.1 | 0.1 | 0.1 |
| Rust-inhibitor | | 0.1 | 0.1 | 0.1 | 0.1 | 0.1 | 0.1 |
| Lubricant | | 1.2 | 1.2 | 1.2 | 1.2 | 1.2 | 1.2 |
| Water | | 86.3 | 88.3 | 86.3 | 88.3 | 68.4 | 43.3 |
| Evaluation test | | | | | | | |
| Glittering feeling | | ○ | ○ | ○ | ○ | ○ | X |
| Writing performance | | ○ | ○ | ○ | ○ | ○ | ○ |

TABLE 3

| | | Examples (Parts by weight) | | | | |
|---|---|---|---|---|---|---|
| | | 11 | 12 | 13 | 14 | 15 |
| Glass flake pigment | ③ | 7.0 | — | 7.0 | — | — |
| | ④ | — | 5.0 | — | 5.0 | 10.0 |
| Water-soluble resin | ① | 0.3 | 0.3 | — | — | — |
| | ② | — | — | 0.3 | 0.3 | 0.2 |
| Colorant | ① | 1.0 | 1.0 | — | — | — |
| | ② | — | — | — | — | 2.0 |
| Pigment base | ① | — | — | 20.0 | 20.0 | — |
| Water-soluble organic solvent | ① | 5.0 | 5.0 | 5.0 | 5.0 | — |
| | ② | — | — | — | — | 7.0 |
| | ③ | — | — | — | — | 14.0 |
| Antiseptic mildew-proofing agent | ① | 0.1 | 0.1 | 0.1 | 0.1 | 0.1 |
| Rust-inhibitor | | 0.1 | 0.1 | 0.1 | 0.1 | 0.1 |
| Lubricant | | 1.2 | 1.2 | 1.2 | 1.2 | 1.2 |
| Water | | 85.3 | 87.3 | 66.3 | 68.3 | 65.4 |
| Evaluation test | | | | | | |
| Glittering feeling | | ○ | ○ | ○ | ○ | ○ |
| Spatial effect | | ○ | ○ | ○ | ○ | ○ |
| Writing performance | | ○ | ○ | ○ | ○ | ○ |

TABLE 4

| | | Examples | | | | Comparative Examples (Parts by weight) | |
|---|---|---|---|---|---|---|---|
| | | 16 | 17 | 18 | 19 | 4 | 5 |
| Glass flake pigment | ① | 0.01 | — | — | 40.0 | 0.005 | 50.0 |
| | ④ | — | 0.5 | 30.0 | — | — | — |
| Water-soluble resin | ① | 0.3 | 0.3 | — | — | 0.3 | 0.3 |
| | ② | — | — | 0.3 | 0.3 | — | — |
| Colorant | ① | 1.0 | 1.0 | 1.0 | 2.0 | — | 2.0 |
| Water-soluble organic solvent | ① | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 |
| Rust-inhibitor | | 0.1 | 0.1 | 0.1 | 0.1 | 0.1 | 0.1 |
| Lubricant | | 1.2 | 1.2 | 1.2 | 1.2 | 1.2 | 1.2 |
| Water | | 92.29 | 91.8 | 92.3 | 51.3 | 93.295 | 41.3 |
| Evaluation test | | | | | | | |
| Glittering feeling | | ○ | ○ | ○ | ○ | X | ○ |
| Spatial effect | | ○ | ○ | ○ | ○ | X | ○ |
| Writing performance | | ○ | ○ | ○ | ○ | ○ | X |

TABLE 5

| | | Examples | | | | Comparative Examples (Parts by weight) | |
|---|---|---|---|---|---|---|---|
| | | 20 | 21 | 22 | 23 | 6 | 7 |
| Glittering pigment | ③ | 0.01 | — | — | 40.0 | 0.005 | 50.0 |
| | ④ | — | 0.5 | 30.0 | — | — | — |
| Water-soluble resin | ① | 0.3 | 0.3 | — | — | 0.3 | 0.3 |
| | ② | — | — | 0.3 | 0.3 | — | — |
| Water-soluble organic solvent | ① | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 |
| Rust-inhibitor | | 0.1 | 0.1 | 0.1 | 0.1 | 0.1 | 0.1 |
| Lubricant | | 1.2 | 1.2 | 1.2 | 1.2 | 1.2 | 1.2 |
| Water | | 93.29 | 92.8 | 63.3 | 53.3 | 93.295 | 43.3 |

TABLE 5-continued (Parts by weight)

|  | Examples | | | | Comparative Examples | |
|---|---|---|---|---|---|---|
|  | 20 | 21 | 22 | 23 | 6 | 7 |
| Evaluation test | | | | | | |
| Glittering feeling | ○ | ○ | ○ | ○ | X | ○ |
| Writing performance | ○ | ○ | ○ | ○ | ○ | X |

TABLE 6

(Parts by weight)

|  |  | Examples | | | | | | |
|---|---|---|---|---|---|---|---|---|
|  |  | 24 | 25 | 26 | 27 | 28 | 29 | 30 |
| Glass flake pigment | ① | 5.0 | 5.0 | — | — | — | — | — |
|  | ② | — | — | 5.0 | — | — | — | — |
|  | ③ | — | — | — | 5.0 | — | — | — |
|  | ④ | — | — | — | — | 5.0 | — | — |
| Glittering pigment | ③ | — | — | — | — | — | 5.0 | — |
|  | ④ | — | — | — | — | — | — | 5.0 |
| Water-soluble resin | ① | 0.3 | 0.3 | — | — | — | 0.3 | — |
|  | ② | — | — | 0.3 | 0.3 | 0.3 | — | 0.3 |
| Colorant | ⑤ | 1.0 | — | 1.0 | 1.0 | — | 1.0 | 1.0 |
|  | ⑥ | — | 1.0 | — | — | 1.0 | — | — |
| Water-soluble organic solvent | ① | 5.0 | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 | 0.1 |
| Rust-inhibitor |  | 0.1 | 0.1 | 0.1 | 0.1 | 0.1 | 0.1 | 0.1 |
| Lubricant |  | 1.2 | 1.2 | 1.2 | 1.2 | 1.2 | 1.2 | 1.2 |
| Water |  | 87.3 | 87.3 | 87.3 | 87.3 | 87.3 | 87.3 | 87.3 |
| Evaluation test | | | | | | | | |
| Glittering feeling |  | ○ | ○ | ○ | ○ | ○ | ○ | ○ |
| Spatial effect |  | ○ | ○ | ○ | ○ | ○ | — | — |
| Writing performance |  | ○ | ○ | ○ | ○ | ○ | ○ | ○ |

TABLE 7

(Parts by weight)

|  |  | Examples | | | |
|---|---|---|---|---|---|
|  |  | 31 | 32 | 33 | 34 |
| Glass flake pigment | ① | 7.0 | — | 7.0 | — |
|  | ② | — | 5.0 | — | 5.0 |
| Glittering pigment | ① | — | — | — | — |
|  | ② | — | — | — | — |
| Water-soluble resin | ④ | 0.3 | — | — | 0.2 |
|  | ⑤ | — | 0.3 | — | 0.1 |
|  | ⑥ | — | — | 0.3 | — |
| Colorant | ① | 1.0 | 1.0 | — | — |
|  | ② | — | — | — | — |
| Pigment base | ① | — | — | 20.0 | 20.0 |
| Water-soluble organic solvent | ① | 5.0 | 5.0 | 5.0 | 5.0 |
|  | ② | — | — | — | — |
|  | ③ | — | — | — | — |
| Antiseptic mildew-proofing agent | ① | 0.1 | 0.1 | 0.1 | 0.1 |
| Rust-inhibitor |  | 0.1 | 0.1 | 0.1 | 0.1 |
| Lubricant |  | 1.2 | 1.2 | 1.2 | 1.2 |
| Water |  | 85.3 | 87.3 | 66.3 | 68.3 |
| Evaluation test | | | | | |
| Glittering feeling |  | ○ | ○ | ○ | ○ |
| Spatial effect |  | ○ | ○ | ○ | ○ |
| Writing performance |  | ○ | ○ | ○ | ○ |

TABLE 8

(Parts by weight)

|  |  | Examples | | | | | |
|---|---|---|---|---|---|---|---|
|  |  | 35 | 36 | 37 | 38 | 39 | 40 |
| Glass flake pigment | ① | 5.0 | 5.0 | 5.0 | — | — | — |
|  | ② | — | — | — | 5.0 | 5.0 | 5.0 |
| Glittering pigment | ① | 5.0 | — | — | 5.0 | — | — |
|  | ② | — | 5.0 | — | — | 5.0 | — |
| Water-soluble resin | ① | 0.3 | 0.3 | 0.3 | 0.3 | 0.3 | 0.3 |
| Pigment base | ③ | — | — | 20.0 | — | — | 20.0 |
| Water-soluble organic solvent | ① | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 |
| Rust-inhibitor |  | 0.1 | 0.1 | 0.1 | 0.1 | 0.1 | 0.1 |
| Lubricant |  | 1.2 | 1.2 | 1.2 | 1.2 | 1.2 | 1.2 |
| Water |  | 83.3 | 83.3 | 68.3 | 83.3 | 83.3 | 68.3 |
| Evaluation test | | | | | | | |
| Glittering feeling |  | ○ | ○ | ○ | ○ | ○ | ○ |
| Spatial effect |  | ○ | ○ | ○ | ○ | ○ | ○ |
| Writing performance |  | ○ | ○ | ○ | ○ | ○ | ○ |

Example 41

An aqueous glittering ink composition of Example 41 was obtained in the composition and amounts (parts by weight) given in Table 9 by the following method of preparation with regard to compounding of the synthetic resin emulsion. That is, water, a water-soluble organic solvent and, as needed, other additives are mixed and stirred; a glass flake pigment is charged to the resultant and stirred; and thereafter a water-soluble thickening resin is added and stirred. Next, the pH of the mixed liquid is adjusted as needed, and a colorant is added and stirred as needed. Subsequently, a synthetic resin emulsion is added and mixed.

In this preparation, heretofore known dispersing, degassing, filtering techniques and the like were adopted. In the foregoing producing process, the pH was adjusted to 8.5 with caustic soda.

Examples 42–49

Aqueous glittering ink compositions of Examples 42–49 were prepared in the same manner as Example 41 except for using the compositions and amounts (parts by weight) given in Tables 9 and 10.

Comparative Examples 8–14

Aqueous glittering ink compositions of Comparative Examples 8–14 were prepared in the same manner as Example 41 except for using the compositions and amounts Warts by weight) given in Tables 9 and 10.

For information, in Examples 42–49 and Comparative Examples 8–14 used, heretofore known dispersing, degassing, filtering techniques and the like were adopted.

TABLE 9

(Parts by weight)

| | | Examples | | | | | Comparative Examples | | |
|---|---|---|---|---|---|---|---|---|---|
| | | 41 | 42 | 43 | 44 | 45 | 8 | 9 | 10 |
| Glass flake pigment | ④ | 5.0 | 5.0 | 5.0 | 5.0 | 5.0 | 5.0 | 5.0 | 5.0 |
| Water-soluble thickening resin | ④ | 0.2 | 0.2 | 0.2 | 0.2 | 0.2 | 0.2 | 0.2 | 0.2 |
| | ⑤ | 0.1 | 0.1 | 0.1 | 0.1 | 0.1 | 0.1 | 0.1 | 0.1 |
| Binder component (solids) | ① | 7.5 | | | | | | | |
| | ② | | 7.5 | | | | | | |
| | ③ | | | 7.5 | | | | | |
| | ④ | | | | 7.5 | | | | |
| | ⑤ | | | | | 7.5 | | | |
| | ⑥ | | | | | | | 2.0 | 15.0 |
| Water-soluble organic solvent | ① | 7.0 | 7.0 | 7.0 | 7.0 | 7.0 | 7.0 | 7.0 | 7.0 |
| | ④ | 15.0 | 15.0 | 15.0 | 15.0 | 15.0 | 15.0 | 15.0 | 15.0 |
| Pigment base | ① | 2.0 | 2.0 | 2.0 | 2.0 | 2.0 | 2.0 | 2.0 | 2.0 |
| Antiseptic mildew-proofing agent | ① | 0.1 | 0.1 | 0.1 | 0.1 | 0.1 | 0.1 | 0.1 | 0.1 |
| Lubricant | | 0.1 | 0.1 | 0.1 | 0.1 | 0.1 | 0.1 | 0.1 | 0.1 |
| Water | | 63.0 | 63.0 | 63.0 | 63.0 | 63.0 | 70.5 | 68.5 | 55.5 |
| Fixability | | ○ | ○ | ○ | ○ | ○ | X | X | ○ |
| Writing aptitude | | ○ | ○ | ○ | ○ | ○ | ○ | ○ | X |
| Glittering feeling | | ○ | ○ | ○ | ○ | ○ | ○ | ○ | ○ |
| Spatial effect | | ○ | ○ | ○ | ○ | ○ | ○ | ○ | ○ |

Note) The binder component is indicated by a content of solids (parts by weight).

In Tables 1–10, each raw material composition is as follows:

(Glass Flake Pigment)
① Trade name "Crystal Color GF2525-M", manufactured by Toyo Aluminium Co., Ltd., median diameter=about 25 μm
② Trade name "Crystal Color GF2540", manufactured by Toyo Aluminium Co., Ltd., median diameter=about 40 μm
③ Trade name "Metashine REFSX-2025PS", manufactured by Toyo Aluminium Co., Ltd., median diameter=about 25 μm
④ Trade name "Metashine REFSX-2040PS", manufactured by Toyo Aluminium Co., Ltd., median diameter=about 40 μm (Glittering Pigment)
① Aluminum powder pigment: trade name "WXM0630", manufactured by Toyo Aluminium Co., Ltd., average particle size=about 8 μm
② Pearlescent pigment: trade name "Iriodin 302", manufactured by Merck Japan Limited, average particle size=about 5–20 μm
③ Metal coated inorganic pigment (yellow): trade name "Paliocrom Gold L2002", manufactured by BASF AG, median diameter=about 20 μm
④ Metal coated inorganic pigment (yellow): trade name "Paliocrom Gold L2022", manufactured by BASF AG, median diameter=about 16 μm (Water-soluble Resin)
① Rhamsan gum: trade name "K7C233", manufactured by Sansho Co., Ltd
② Welan gum: trade name "K1C376", manufactured by Sansho Co., Ltd
③ Carboxymethyl cellulose (CMC): trade name "Cellogen 7A", number average molecular weight= 27000–33000, manufactured by Dai-ichi Kogyo Seiyaku Co., Ltd.
④ Xanthan gum: trade name "Kelzan", manufactured by Kelco a unit of Monsanto Company.

TABLE 10

(Parts by weight)

| | | Examples | | | | Comparative Examples | | | |
|---|---|---|---|---|---|---|---|---|---|
| | | 46 | 47 | 48 | 49 | 11 | 12 | 13 | 14 |
| Glass flake pigment | ④ | 5.0 | 0.5 | 30 | 5.0 | 5.0 | 5.0 | 0.005 | 50 |
| Water-soluble thickening resin | ④ | 0.2 | 0.2 | 0.2 | 0.2 | 0.2 | 0.2 | 0.2 | 0.2 |
| | ⑤ | 0.1 | 0.1 | 0.1 | 0.1 | 0.1 | 0.1 | 0.1 | 0.1 |
| Binder component (solids) | ① | 40 | | | 0.01 | 0.005 | 45 | | |
| | ② | | 7.5 | 7.5 | | | | 7.5 | 7.5 |
| Water-soluble organic solvent | ① | 7.0 | 7.0 | 7.0 | 7.0 | 7.0 | 7.0 | 7.0 | 7.0 |
| | ④ | 15.0 | 15.0 | 15.0 | 15.0 | 15.0 | 15.0 | 15.0 | 15.0 |
| Pigment base | ① | 2.0 | 2.0 | 2.0 | 2.0 | 2.0 | 2.0 | 2.0 | 2.0 |
| Antiseptic mildew-proofing agent | ① | 0.1 | 0.1 | 0.1 | 0.1 | 0.1 | 0.1 | 0.1 | 0.1 |
| Lubricant | | 0.1 | 0.1 | 0.1 | 0.1 | 0.1 | 0.1 | 0.1 | 0.1 |
| Water | | 30.5 | 67.5 | 38.0 | 70.49 | 70.495 | 25.5 | 67.995 | 18.0 |
| Fixability | | ○ | ○ | ○ | ○ | X | ○ | ○ | ○ |
| Writing aptitude | | ○ | ○ | ○ | ○ | ○ | X | ○ | X |
| Glittering feeling | | ○ | ○ | ○ | ○ | ○ | X | X | ○ |
| Spatial effect | | ○ | ○ | ○ | ○ | ○ | X | X | ○ |

Note) The binder component is indicated by a content of solids (parts by weight).

⑤ Polyacrylic acid: trade name "Carbopol 940", manufactured by BF Goodrich Co., Ltd.
⑥ Succinoglycan: trade name "Reozan", manufactured by Sansho Co., Ltd (Water-soluble Organic Solvent)
① Glycerin
② Dipropylene glycol monopropyl ether
③ Dipropylene glycol monomethyl ether
④ Propylene glycol (Colorant)
① Yellow dye: trade name "Yellow 202 (1)", Acid Yellow 73, Aizen Co., Ltd.
② Red dye: trade name "Chugai Aminol First pink R", xanthen-type, manufactured by Chugai Kasei Co., Ltd.
③ Blue pigment: trade name "Firstgen Blue TGR", phthalocyanine blue, manufactured by Dainippon Ink & Chemicals, Inc.
④ Yellow pigment: trade name "Seikafast Yellow A-3", azo-type, manufactured by Dainichiseika Color & Chemicals Mfg. Co., Ltd.
⑤ Yellow resin emulsion: trade name "LUMIKOL NKW-2105", yellow fluorescent pigment, manufactured by Nippon Keiko Kagaku CO., Ltd.
⑥ Blue resin emulsion: trade name "LUMIKOL NKW-2108", blue fluorescent pigment, manufactured by Nippon Keiko Kagaku CO., Ltd.
⑦ White pigment: trade name "Kronos-KR380", titanium oxide, manufactured by Titan Kogyo CO., LTD.

(Pigment Base)
① Pigment base: A pigment dispersion of a pigment base was obtained, in the form of a water dispersion of pigment (average particle size=0.08 μm; solid content=10% by weight), by adding and dissolving triethylamine to a mixture obtained by mixing the above-mentioned blue pigment ③ and the following resin for dispersing pigment in the following proportion, and thereafter conducting dispersion with a ball mill. As the resin for dispersing pigment a styrene-acryl copolymer was used (trade name "JOHNCRYL J683", Johnson Polymer Co., Ltd., weight average molecular weight=8000).

| Blue pigment ③ | 5 parts by weight |
| Resin for dispersing pigment | 1 part by weight |

② Pigment base: A pigment dispersion of a pigment base was obtained, in the form of a water dispersion of pigment (average particle size=0.08 μm; solid content=10% by weight), by adding and dissolving triethylamine to a mixture obtained by mixing the above-mentioned yellow pigment ④ and the following resin for dispersing pigment in the following proportion, and thereafter conducting dispersion with a ball mill. As the resin for dispersing pigment was used a styrene-acryl copolymer (trade name "JOHNCRYL J683", Johnson Polymer Co., Ltd., weight average molecular weight=8000).

| Yellow pigment ④ | 5 parts by weight |
| Resin for dispersing pigment | 1 part by weight |

③ Pigment base: A pigment dispersion of a pigment base was obtained, in the form of a water dispersion of pigment (average particle size=0.4 μm; solid content=10% by weight), by adding and dissolving triethylamine to a mixture obtained by mixing the above-mentioned white pigment ⑦ and the following resin for dispersing pigment in the following proportion, and thereafter conducting dispersion with a ball mill. As the resin for dispersing pigment is used a styrene-acryl copolymer (trade mane "JOHNCRYL J683", Johnson Polymer Co., Ltd., weight average molecular weight=8000).

| White pigment ⑦ | 5 parts by weight |
| Resin for dispersing pigment | 1 part by weight |

(Antiseptic mildew-proofing agent)
① 1,2-Benzoisothiazolin-3-one (trade name "Proxell GXL", Hoechst Synthesis Co., Ltd.)

(Rust-inhibitor)
Benzotriazole (Lubricant)
Maleic monoamide (Preparation of Test Samples)
Next, each of the ink compositions of Examples and Comparative Examples given in Tables 1–10 was packed into an ink container made of a hollow polypropylene tube equipped with a ball-point pen tip made of stainless steel (ball material: silicon carbide), and ball-point pens of test samples having the ink containers therein were prepared.

(Evaluation Test)
The glittering feeling and spatial effect of each ink composition for the Examples and Comparative Examples given in Table 1 and the glittering feeling of each ink composition for the Examples and Comparative Examples given in Table 2 were evaluated by writing on commercially available loose-leaf sheets with these ball-point pens. The glittering feeling and spatial effect of each ink for the Examples and Comparative Examples given in Tables 3–4, the glittering feeling of each ink for the Examples and Comparative Examples given in Table 5, the glittering feeling and spatial effect of the ink for Example 28 given in Table 6 and the glittering feeling of each ink for Examples 29 and 30 given in Table 6 were evaluated. The glittering feeling and spatial effect of each ink wherein other water-soluble resins were incorporated were evaluated for Examples 31–34 given in Table 7. The glittering feeling and spatial effect of each ink were evaluated for Examples 35–40 given in Table 8. Also, the writing performance was evaluated for each Example and each Comparative Example given in Tables 1–8. The glittering feeling, spatial effect and furthermore fixability and writing aptitude were evaluated for each ink of Examples 41–49 containing resin emulsions given in Tables 9 and 10.

(Evaluation of Glittering Feeling)
Evaluation of the glittering feeling was conducted by visual observation of writings. Rating criteria were: ○ for ones having strong glittering feeling; X for ones having little or no glittering feeling.

(Evaluation of Spatial Effect)
Evaluation of the spatial effect also was conducted by visual observation. Rating criteria were: ○ for ones having spatial effect; X for ones having no spatial effect.

(Evaluation of Writing Performance)
The writing performance was evaluated according to feeling in writing. Rating criteria were: ○ for ones having good writing performance and permitting smooth writing; X for ones having poor writing performance and not permitting smooth writing very much.

(Test of Fixability)

The fixability shown in Tables 9 and 10 was evaluated according to the following criteria by writing on commercially available loose-leaf sheets with ball-point pens of test samples according to every Example and Comparative Example, drying the handwritings, thereafter adhering commercially available adhesive cellophane tapes thereon, and then visually observing conditions after peeling the tapes.

○: A glass flake pigment remains on the handwriting and the glittering feeling before peeling of the cellophane tape has not been lost.

X: A glass flake pigment is peeled from the handwriting and the glittering feeling before peeling of the cellophane tape has been lost.

(Test of Writing Characteristics)

The writing characteristics shown in Tables 9 and 10 were evaluated by writing on commercially available loose-leaf sheets with ball-point pens of test samples according to every Example and Comparative Example, and rating writing feeling according to the following criteria.

○: Writing feeling is smooth.

X: Writing feeling is heavy and the ink does not flow. A double-line handwriting was obtained.

Tables 1–10 show results of glittering feeling, spatial effect and writing performance in each Example and each Comparative Example.

From Table 1, Examples 1 and 2 provided handwritings having both a strong glittering feeling like sunshine and strong spatial effect. Examples 3 and 4 provided handwritings having a strong glittering feeling like stars twinkling in the night sky and strong spatial effect. Example 5 provided a coated film with a glittering feeling and spatial effect inside and a double-colored red handwriting outside. On the other hand, Comparative Examples 1 and 2 provided handwritings having weak glittering feeling but having no spatial effect. Writing performances of the inks of Examples 1–5 were good as in Comparative Examples 1 and 2.

From Table 2, Examples 6–9 containing metal coated inorganic pigments as glittering pigments provided golden handwritings with strong glittering feeling. Likewise, Example 10 containing a metal coated inorganic pigment as a glittering pigment provided a coated film having glittering feeling inside and a double-colored red handwriting. On the other hand, Comparative Example 3 containing an aluminum powder pigment as a glittering pigment provided a golden metallic handwriting having poor and weak glittering feeling. Writing performances of the inks of Examples 6–10 were good as in Comparative Example 3.

The ink compositions of Examples 1–5 containing glass flake pigments can provide handwritings with an unprecedented unique feeling since these ink compositions can provide handwritings with both a strong glittering feeling and strong spatial effect by comprising glass flake pigments and colorants instead of using glittering pigments as in Comparative Examples 1–2.

The ink compositions of Examples 6–10 cannot provide strong spatial effect but can provide handwritings or coated films having a strong glittering feeling without loosing glitter in comparison to the ink composition of Comparative Example 3.

From Table 3, the inks of Examples 11 and 12 provided handwritings having a strong glittering feeling like sunshine and strong spatial effect as in the inks of Examples 1 and 2. The inks of Examples 13 and 14 provided handwritings having a strong glittering feeling like stars twinkling in the night sky and strong spatial effect as in the inks of Examples 3 and 4. The ink of Example 15 provided a glittering coated film inside and a double-colored red handwriting outside as in the ink of Example 10. The inks of these Examples 11–15 were also good in writing performance.

From Table 4, the inks of Examples 16–19 containing glass flake pigments in 0.01–40% by weight relative to the total amount of the ink compositions provided good writing performances and also provided handwritings having a strong glittering feeling and spatial effect. On the other hand, the ink of Comparative Example 4 containing a glass flake pigment in less than 0.01% by weight relative to the total amount of the ink composition did not provide a strong glittering feeling and the glittering feeling was poor and weak. Moreover, the ink of Comparative Example 4 also had a weak spatial effect which had been reduced. On the other hand, the ink of Comparative Example 5 containing a glass flake pigment in more than 40% by weight relative to the total amount of the ink composition had both strong glittering feeling and strong spatial effect, but had poor writing characteristics.

From Table 5, the inks of Examples 20–23 containing metal coated inorganic pigments as glittering pigments in 0.01–40% by weight relative to the total amount of the ink compositions provided good writing performances and also provided handwritings having strong glittering feeling. On the other hand, the ink of Comparative Example 6 containing a metal coated inorganic pigment in less than 0.01% by weight relative to the total amount of the ink composition provided no strong glittering feeling and the glittering feeling was poor and weak. On the other hand, the ink of Comparative Example 7 containing a metal coated inorganic pigment in more than 40% by weight relative to the total amount of the ink composition had a strong glittering feeling, but had poor writing performance.

From Table 6, the inks of Examples 24–28 provided fluorescent handwritings having a strong glittering feeling and spatial effect. The inks of Examples 29 and 30 provided fluorescent golden handwritings having a strong glittering feeling. In the case of these inks, writing performance was also good.

From Table 7, also the inks of Examples 31 to 34 wherein water-soluble resins including xanthan gum, polyacrylic acid and succinoglycan are compounded provided handwritings having a strong glittering feeling and spatial effect. Moreover, from Table 8, in the case of the inks of Examples 35–40 containing an aluminum powder pigment, titanium oxide and the like, the colors of the handwritings were clearly shown up even on a black paper because of their sufficient opacifying power, and glittering handwritings having a strong glittering feeling and spatial effect were obtained.

From Tables 9 and 10, the aqueous glittering ink composition of Examples 41–49 exhibited a glittering feeling suggestive of a jewel, aquamarine, and provided good fixability and good writing aptitude.

On the other hand, Comparative Example 8 provided a glittering feeling and spatial effect suggestive of a jewel, aquamarine, but no fixability was obtained at all. In Comparative Example 9, a glittering feeling and spatial effect suggestive of a jewel, aquamarine, provided and writing aptitude was good, but no fixability was obtained at all. Moreover, in Comparative Example 10, a glittering feeling and spatial effect suggestive of a jewel, aquamarine, provided and fixability was good, but writing performance was poor.

Furthermore, Table 10 shows that the ink compositions of the Examples preferably contain the synthetic resin emulsions in 0.01–40% by weight in solids relative to the total amounts of the ink compositions. It also shows that the ink compositions of the Examples preferably contain the glass flake pigments in 0.01–40% by weight relative to the total amounts of the ink compositions.

Moreover, although each of the above-mentioned Examples applied the ink compositions for those for ball-point pens, it can be used for other writing tools, printing inks, fields pertaining to coatings, to cosmetics, and the like.

Since the present invention is an aqueous glittering ink composition containing a glass flake pigment, a water-soluble resin, a water-soluble organic solvent and water, it can provide an unprecedented unique handwriting or coated film having a glittering feeling and spatial effect stronger than that of aqueous ink composition using conventional glittering pigments. In particular, in the case of the foregoing aqueous glittering ink composition containing a colorant together with a glass flake pigment, the strong glitter depending upon the hue of the colorant can be provided to a handwriting or a coated film.

Furthermore, the aqueous glittering ink composition wherein a metal coated inorganic pigment is compounded as a glittering pigment and which contains, at least, a water-soluble resin, a water-soluble organic solvent and water can provide a handwriting or a coated film having a strong glittering feeling without loosing glittering feeling in comparison to the aqueous ink composition using conventional glittering pigments. Moreover, in the case of the above-mentioned aqueous glittering ink composition containing a colorant together with a metal coated inorganic pigment, the strong glitter depending upon the hue of the colorant can be provided to a handwriting or a coated film.

Moreover, the aqueous glittering ink composition containing a glass flake pigment, a water-soluble thickening resin, a water-soluble organic solvent and water as essential ingredients and containing a binder component, preferably a synthetic resin emulsion, for fixing the glass flake pigment to a handwriting or a coated film can improve fixability of the glass flake pigment to the handwriting or the coated film and can continue to provide a stronger glittering feeling and spatial effect to the handwriting or the coated film without deteriorating ink characteristics or writing characteristics and without inhibiting effects of the compounding of the glass flake pigment on the strong glittering feeling and spatial effect.

In addition, the present invention includes the identical subject matter disclosed in the specification, claims of Japanese Patent application No. 11-076868, No. 11-360187, No. 2000-002370, and No. 2000-002344 to which is claimed priority for the present application.

What is claimed is:

1. An aqueous glittering ink composition comprising
    a metal coated inorganic pigment,
    a water-soluble resin,
    a water-soluble organic solvent, and
    water,
wherein said metal inorganic pigment is an inorganic pigment which is coated with metal which provides a metal reflecting surface.

2. An aqueous glittering ink composition as set forth in claim 1, wherein the metal coated inorganic pigment is contained in about 0.01–40% by weight relative to the total amount of the ink composition.

3. An aqueous glittering ink composition as set forth in claim 1, wherein the metal coated inorganic pigment has median diameter of about 5–100 μm.

4. An aqueous glittering ink composition as set forth in claim 1, wherein the water-soluble resin is contained in about 0.01–40% by weight relative to the total amount of the ink composition.

5. An aqueous glittering ink composition as set forth in claim 1, further containing a colorant in about 0.05–15% by weight relative to the total amount of the ink composition.

6. An aqueous glittering ink composition as set forth in claim 1, further containing an opacifying pigment.

7. An aqueous glittering ink composition comprising
    a metal coated inorganic pigment,
    a water-soluble resin,
    a water-soluble organic solvent,
    water, and
    a colorant,
wherein said metal coated inorganic pigment is an inorganic pigment which is coated with metal which provides a metal reflecting surface.

8. A writing tool having an ink container in which an aqueous glittering ink composition is packed, wherein said aqueous glittering ink composition comprises
    a metal coated inorganic pigment which is an inorganic pigment which is coated with metal which provides a metal reflective surface and having a median diameter of about 5–100 μm,
    a water-soluble resin,
    a water-soluble organic solvent, and
    water.

9. A writing tool as set forth in claim 8, wherein said inorganic pigment coated with a metal is contained in about 0.01–40% by weight, relative to the total amount of the ink composition.

10. A writing tool as set forth in claim 8, wherein the viscosity of ink measured by an ELD viscometer 3° R14 cone; rotation speed: 0.5 rpm; 20° C. is about 1000 to 10000 mPa·s.

11. A writing tool as set forth in claim 8, wherein said aqueous glittering ink composition further comprises a colorant in about 0.01–30% by weight relative to the total amount of the ink composition.

12. A writing tool having an ink container that is made of a hollow tube equipped with a ball-point pen tip at one end, wherein said ink container has a aqueous glittering ink composition packed therein, said aqueous glittering ink composition comprising
    a metal coated inorganic pigment which is an inorganic pigment which is coated with metal which provides metal reflecting surface and having a median diameter of about 5–100 μm and contained in about 1.0–40% by weight,
    a water-soluble resin contained in about 0.01–40% by weight and
    a water-soluble organic solvent contained in about 1.00–40 % by weight relative to the total amount of the ink composition, and
    water.

13. A writing tool as set forth in claim 12, wherein said water-soluble resin is a water-soluble thickening resin and the viscosity of the aqueous glittering ink measured by an ELD viscometer 3° R14 cone; rotation speed: 0.5 rpm; 20° C. is about 1000 to 10000 mPa·s.

14. A writing tool as set forth in claim 13, wherein said water-soluble thickening resin is a microbial polysaccharide or a derivative thereof, selected from the group consisting of pollulan, xanthan gum, welan gum, rhamsan gum, succinoglucan and dextran.

15. A writing tool as set forth in claim 13, wherein said inorganic pigment is coated with metal by means of metal deposition.

16. A method for using an aqueous glittering ink composition for a writing tool, the method comprising:
   providing an aqueous glittering ink composition which comprises a metal coated inorganic pigment which is an inorganic pigment which is coated with metal which provides a metal reflecting surface and having a median diameter of about 5–100 μm,
   a water-soluble resin,
   a water-soluble organic solvent, and
   water.

17. A method of claim 16, wherein the viscosity of said aqueous glittering ink measured by an ELD viscometer 3° R14 cone; rotation speed: 0.5 rpm; 20° C. is about 1000 to 10000 mPa·s.

18. A method for using an aqueous glittering ink composition for a writing tool, the method comprising:
   providing an aqueous glittering ink composition which comprises
      a metal coated inorganic pigment which is an inorganic pigment which is coated with metal which provides a metal reflecting surface and has a median diameter of about 5–100 μm,
      a water-soluble resin,
      a water-soluble organic solvent, and
      water,
   packing said aqueous glittering ink composition into an ink container made of a hollow tube, and equipping a ball-point pen tip with said ink container.

19. A method of claim 18, wherein the viscosity of the aqueous glittering ink composition measured by an ELD viscometer 3° R14 cone; rotation speed: 0.5 rpm; 20° C. is about 1000 to 10000 mPa·s.

20. A method for using an aqueous glittering ink composition for a writing tool, the method comprising:
   providing an aqueous glittering ink composition which comprises
      a metal coated inorganic pigment which is an inorganic pigment which is coated with metal which provides a metal reflecting surface and having a median diameter of about 5–100 μm and contained in about 1.0–40% by weight,
      a water-soluble resin contained in about 0.01–40% by weight, and
      a water-soluble organic solvent contained in about 1.00–40% by weight relative to the total amount of the ink composition.

21. A method of claim 20, wherein the viscosity of the aqueous glittering ink composition measured by an ELD viscometer 3° R14 cone; rotation speed: 0.5 rpm; 20° C. is about 1000 to 10000 mPa·s.

22. A method for using an aqueous glittering ink composition for a writing tool, the method comprising:
   providing an aqueous glittering ink composition which comprises
      a metal coated inorganic pigment which is an inorganic pigment which is coated with metal which provides a metal reflecting surface and having a median diameter of about 5–100 μm and contained in about 1.0–40% by weight,
      a water-soluble resin contained in about 0.01–40% by weight, and
      a water-soluble organic solvent contained in about 1.0–40% by weight relative to the total amount of the ink composition;
   packing said aqueous glittering ink composition into an ink container made of a hollow tube, an equipping a ball point pen tip with said ink container.

23. An aqueous glittering ink composition comprising
   a metal coated inorganic pigment,
   a colorant,
   a water-soluble resin,
   a water-soluble organic solvent, and
   water,
   wherein said metal coated inorganic pigment is an inorganic pigment coated not with a metal oxide but with a metal, and have a median diameter of about 5–100 μm and contained in about 1.0–40% by weight relative to the total amount of the ink composition, said colorant in 0.01–30% by weight relative to the total amount of the ink composition and said water-soluble resin is the water-soluble thickening resin and the viscosity of aqueous glittering ink measured by a ELD viscometer 3° R14 cone; rotation speed: 0.5 rpm; 20° C. is 1000 to 10000 mPa·s.

24. An aqueous glittering ink composition as set forth in claim 23, wherein the water-soluble resin is contained in 0.01–40% by weight relative to the total amount of the ink composition.

25. A composition as claimed in claim 23, further containing an opacifying pigment.

26. A writing tool having an ink container in which an aqueous glittering ink composition is packed, wherein said aqueous glittering ink composition comprises an inorganic pigment coated not with a metal oxide but with a metal, having a median diameter of about 5–100 μm and contained in about 1.0–40% by weight, a water-soluble resin is contained in 0.01–40% by weight, a colorant is contained in 0.01–30% by weight, relative to the total amount of the ink composition, an water, and said water-soluble resin is a water-soluble thickening resin and the viscosity of said aqueous glittering ink composition measured by an ELD viscometer 3° R14 cone; rotation speed: 0.5 rpm; 20° C. is 1000 to 10000 mPa·s.

27. A writing tool as set forth in claim 26, wherein said water-soluble thickening resin is microbial polysaccharides and derivatives thereof, selected from the group consisting of pollulan, xanthan gum, welan gum, rhamsan gum, succinoglucan and dextran.

28. A writing tool as set forth in claim 26, wherein said inorganic pigment is coated with metal by means of metal deposition.

29. A method for using an aqueous glittering ink composition for a writing tool, the method comprising:
   providing an aqueous glittering ink composition which comprises a metal coated inorganic pigment,
   a colorant,
   a water-soluble resin,
   a water-soluble organic solvent and
   water,
   wherein said metal coated inorganic pigment is an inorganic pigment coated not with a metal oxide but with a metal and have a median diameter of about 5–100 μm and contained in about 1.0–40% by weight relative to the total amount of the ink composition, said colorant in 0.01–30% by weight relative to the total amount of the ink compostion and said water-soluble resin is a water-soluble thickening resin and the viscosity of said aqueous glittering ink composition measured by an ELD viscometer 3° R14 cone; rotation speed: 0.5 rpm; 20 ° C. is 1000 to 10000 mPa·s.

30. A method for using an aqueous glittering ink composition for a writing tool the method comprising:
   providing an aqueous glittering ink composition which comprises an inorganic pigment coated not with a metal oxide but with a metal having a median diameter of about 5–100 μm, a water-soluble resin, a water-soluble organic solvent and water, packing said aqueous glittering ink composition into an ink container made of a hollow tube, and equipping a ball-point pen tip with said ink container.

31. A method of claim 30, wherein the viscosity of said aqueous glittering ink composition measured by an ELD viscometer 3° R14 cone; rotation speed: 0.5 rpm; 20° C. is about 1000 to 10000 mPa·s.

32. A method for using an aqueous glittering ink composition for a writing tool, the method comprising:

providing an aqueous glittering ink composition which comprises an inorganic pigment coated not with a metal oxide but with a metal having a median diameter of about 5–100 μm and contained in about 1.0–40% by weight, a water-soluble resin contained in 0.01–40% by weight and a water-soluble organic solvent contained in about 1.00–40% by weight relative to the total amount of the ink composition.

33. A method of claim 32, wherein the viscosity of aqueous glittering ink measured by a ELD visocmeter 3° R14 cone; rotation speed: 0.5 rpm; 20° C. is about 1000 to 10000 mPa·s.

34. A method for using an aqueous glittering ink composition for a writing tool, the method comprising:

providing an aqeuoue glittering ink composition which comprises an inorganic pigment coated not with a metal oxide but with a metal having a median diameter of about 5–100 μm and contained in about 1.0–40% by weight, a water-soluble resin contained in 0.01–40% by weight and a water-soluble organic solvent contained in about 1.00–40% by weight relative to the total amount of the ink composition;

packing said aqueous glittering ink composition into an ink container made of a hollow tube, and equipping a ball-point pen tip with said ink container.

* * * * *